April 30, 1935.
J. LEDWINKA
2,000,000
VEHICLE WHEEL CONSTRUCTION
Original Filed May 12, 1932
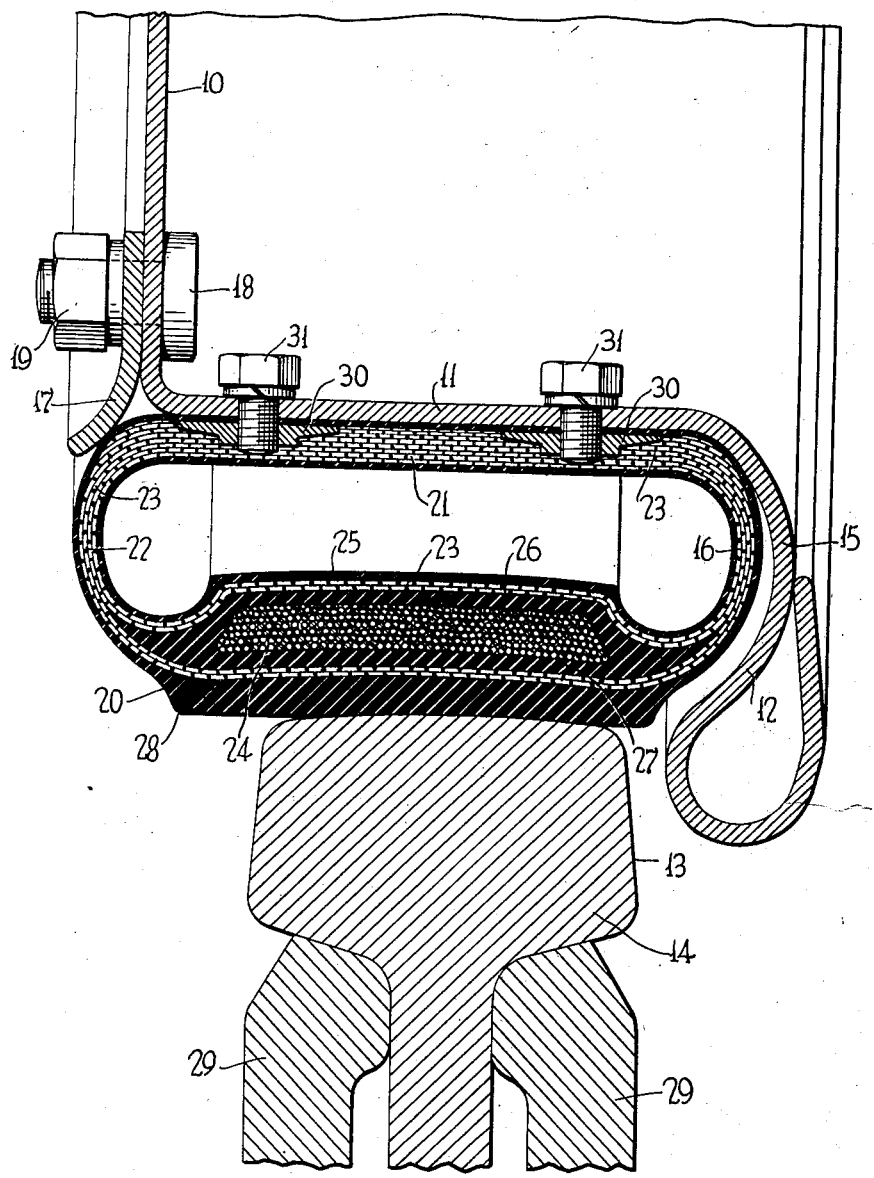
INVENTOR
JOSEPH LEDWINKA.
BY
John P. Barbox
ATTORNEY Patented Apr. 30, 1935

2,000,000

UNITED STATES PATENT OFFICE 2,000,000

VEHICLE WHEEL CONSTRUCTION

Joseph Ledwinka, Philadelphia, Pa., assignor to Edward G. Budd Manufacturing Company, Philadelphia, Pa., a corporation of Pennsylvania Application May 12, 1932, Serial No. 610,760
Renewed September 10, 1934

3 Claims. (Cl. 295—34)

The invention relates to vehicle wheels having pneumatic tires, and more particularly to pneumatic tired wheels for railway vehicles such as rail cars.

The high speeds at which modern pneumatic tired vehicles travel on roadways or railways make it absolutely necessary that extra precautionary measures be taken to insure the safety of passengers and cargo, and to make possible the continued use of the vehicle with a minimum of repair. In railcars, particularly, where exceedingly high torque conditions are set up in the wheels during acceleration and deceleration, slippage or other relative movement between the tires and the wheels must be adequately prevented.

My invention has for its objects improvements over the precautionary measures which have been taken heretofore. These objects have been accomplished by mechanically securing the tire to the rim by means passing through the rim and cooperating with means within the tire.

These and other objects of my invention will be apparent from a reading of the sub-joined specification in light of the drawing; in which the figure shown is a transverse cross section of a railway vehicle wheel in combination with a railway track, embodying my invention. Inasmuch as the general application is substantially the same in the case of vehicle wheels other than for railways, I have preferred to confine my specification to the embodiment shown, with the intention, however, that it shall be couched in such terms and given such an interpretation as to include all variations.

In the drawing the main body of the wheel is indicated by reference numeral 10, and is mounted upon the axle or hub of the railway vehicle (not shown). The wheel body is preferably made of sheet metal and is provided with an axially extended cylindrical portion 11, adapted to provide a seat for a pneumatic tire, supplanting the usual rim member. Cylindrical portion 11 is flanged radially outwardly as at 12 to provide a wheel retaining flange, the function of which as usual in railway vehicles is the engagement with the inner edge 13 of the rail 14 to retain the vehicle upon the trackway and guide it thereover. A portion of this radially extending flange 12 is bulged outwardly as at 15 to provide space for the inner side wall 16 of the tire. The outer side of the wheel body is provided with a sheet metal flange 17, secured to the wheel by bolts 18 and nuts 19, arranged in an annular series, to prevent the lateral displacement of the tire with respect to the rim base.

The radially outer wall 20 of the tire is substantially cylindrical and in concentric spaced relationship to the radially inner wall 21, and the outer side wall 22 is of substantially the same curvature as the inner wall 16. The tire consists chiefly of bands of fabric or tension resisting material 23 wound transversely of the tire. In addition to these transverse windings 23, the tire embodies in the radially outer wall 20 an annular series of windings 24 wound consecutively or otherwise circumferentially to the outer wall. These windings 24 in the instance shown, are preferably of fabric cord having ample capacity to resist tension. The annular windings are of such strength as to preclude expansion beyond a determinate diameter and thereby limit the expansion of the tire under all conditions of pressure to a pre-determined diameter and likewise restricts the shape of the outer peripheral wall to a substantially cylindrical shape of determinate diameter.

While the radially inner wall is of relatively simple cross section, comprising the aforementioned transverse fabric windings covered on the inner and outer sides by rubber, the radially outer wall is somewhat more complex due to the presence of the annular windings which are interposed on substantially the same diameter as the transverse windings, and are spaced therefrom by rubber. This outer wall, in the embodiment shown comprises the following series of laminations, progressing from the inside outwardly viz; a rubber inner wall 25, continuous and integral with the wall following the entire section of the tire, a plurality of layers of transverse fabric 23, another rubber wall 26, the annular windings 24, another rubber wall 27, a plurality of transverse windings 23, and an outer mass of solid rubber 28 to provide the tread of the tire, to take the wear, and to give a cushioning effect. It will be seen that the interposition of the annular windings, and the laminated layers of rubber and fabric enlarge that portion of the tire directly adjacent the rail head, to such a degree that upon deflation of the tire, the inner rubber surfaces will contact, limiting the degree of radial drop of the wheel toward the rail, and preventing the flange from striking any obstruction, such as fish plates 29, fish plate bolts or other projections.

In order to absolutely position the tire on the rim base in a predetermined position with respect to the wheel retaining flange, and to prevent any lateral, radial or annular displacement of the tire relative to the tire base and wheel retaining flange, I have provided a series of metallic inserts 30, which may be a series of separate threaded washers or may be annular metallic bands. The central portions of these metallic members are embossed toward the outside of the wheel and are threaded through their embossed portions. Bolts or machine screws 31 are threaded through the rim and the outer layer of rubber 28 into these metallic members. The metallic members are imbedded within the outer layer of rubber 28, in the layers of transverse fabric windings 23, to which they may be vulcanized.

By the above provision, the tire as a whole is maintained absolutely in the correct relationship with the wheel retaining flange, thus insuring that full tread contact will be afforded between the rail and the wheel. The severe torque which is imposed upon a rail car wheel as a whole either when starting or when the vehicle brakes are applied to arrest the motion of the car often causes the tire to slip circumferentially relative to the tire base. It will be apparent that such slippage whether circumferential or lateral might produce disastrous results by throwing the tire out of line with respect to the rail. Further, the metallic members within the tire being mechanically secured to the rim base prevent the tire from being thrown off altogether upon sudden deflation thereof at high speeds. This added precaution, with the aid of the tire retaining flange, makes certain the continued correct position of the tire on the tire base in a very simple and efficient manner. To remove the tire from the tire base it is merely necessary to unscrew the bolts 31, and remove the tire retaining flange 17 by removing its series of nuts 19 and bolts 18.

The exceedingly sturdy cross section of the outer tire wall makes it practical to use at high speeds, and is exceptionally light in weight. A rail car or another vehicle provided with wheels and tires of the nature hereinbefore described, may attain exceptional high rates of speed, may be braked as severely as desired, or may, upon deflation of the tires, continue uninterrupted to its destination without the necessity of changing wheels or tires enroute, or without any possible danger to the car or its occupants.

It will be seen that the interposition of the metallic members cooperating with the bolts, passing through the tire base absolutely precludes the possibility of accidental shifting or displacement of the tire relative to the tire base. The wheel body, by virtue of its sheet metal construction, is very light in weight, yet is strong enough to take the load of a very heavy car, under all conditions of operation. It will be apparent that I have attained in full the objects of my invention by the provision of the means hereinbefore described.

Many modifications of my invention may be made without departing from the generic spirit thereof and I do not therefore wish to be limited by the circumstantial terminology of the specification but rather solely by the scope of the appended claims.

What I claim is:

1. The combination with a rail wheel provided with a retaining flange, of a pneumatic tire mounted upon said wheel adjacent said flange and having a transversely elongated cross section, said tire having an outer tread wall having a tread portion transversely relatively flat of a width somewhat greater than the width of a rail head, said tread wall being thickened by an inward protuberance comprising inner transverse fabric windings, and an outer annular substantially inextensible layer of annular windings, said windings being embedded in the rubber mass of the tread wall.

2. The combination with a rail wheel provided with a retaining flange, of a pneumatic tire mounted upon said wheel adjacent said flange and having a transversely elongated cross section, said tire having an outer tread wall having a tread portion transversely relatively flat and of a width somewhat greater than the width of a rail head, said tread wall being thickened by an inward protuberance of a width not substantially less than the width of a rail head, said tread wall comprising inner transverse fabric windings adjacent the inner wall of said protuberance and outer transverse fabric windings, both said windings extended into the side walls of the tire, and an intermediate substantially inextensible layer of annular windings of substantially the width of said protuberance, all of said windings being embedded in the rubber mass of the tread wall.

3. The combination with a rail wheel provided with a retaining flange, of a pneumatic tire mounted upon said wheel adjacent said flange and having a transversely elongated cross section, said tire having an outer tread wall having a tread portion transversely relatively flat, and an inward protuberance of a width not substantially less than the width of a rail head and comprising a thick substantially inextensible layer of annularly wound strands of substantially the width of the protuberance and embedded in rubber.

JOSEPH LEDWINKA.